US006282890B1

(12) United States Patent
Takano

(10) Patent No.: US 6,282,890 B1
(45) Date of Patent: Sep. 4, 2001

(54) HYDRAULIC CIRCUIT FOR CONSTRUCTION MACHINES

(75) Inventor: Osamu Takano, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/489,147

(22) Filed: Jan. 21, 2000

(51) Int. Cl.[7] .......................... F16D 31/02

(52) U.S. Cl. .......................... 60/420; 60/444; 60/445; 60/464

(58) Field of Search .......................... 60/420, 422, 445, 60/447, 464, 468, 443, 444

(56) References Cited

U.S. PATENT DOCUMENTS 4,523,430 * 6/1985 Masuda .......................... 60/420

FOREIGN PATENT DOCUMENTS 61294031 12/1986 (JP) .
63138026 6/1988 (JP) .
4-26263 3/1992 (JP) .
4130361 11/1992 (JP) .
6-72437 9/1994 (JP) .

* cited by examiner

*Primary Examiner*—John E. Ryznic
(74) *Attorney, Agent, or Firm*—Varndell & Varndell, PLLC

(57) ABSTRACT

The invention provides a hydraulic circuit for construction machines, capable of obtaining a satisfactory suspending capability during load suspending work, and having an improved operation efficiency with a decrease in the working speed of a load suspending operation minimized, the hydraulic circuit including a suspension mode switch for setting a working mode to a suspension mode, a lift detecting sensor for detecting a predetermined actuator which has been operated to a load lifting side, a relief valve control unit capable of freely setting an object pressure of the relief valve 14 to a normal set level and a high set level higher than the normal set level, a cutoff valve control unit capable of freely switching the cutoff valve to a cutoff operation executing mode and a cutoff operation disengaging mode, and a controller adapted to increase a set pressure of the relief valve by outputting an instruction to the relief valve control unit when the controller receives a suspension mode signal and a lift detected signal from the suspension mode switch and lift detecting sensors respectively, and disengage the cutoff function of the cutoff valve by outputting an instruction to the cutoff valve control unit.

4 Claims, 8 Drawing Sheets

HYDRAULIC CIRCUIT FOR CONSTRUCTION MACHINES

BACKGROUND OF THE INVENTION

1. Field of the Invention

This invention relates to a hydraulic circuit for construction machines, and more particularly to a cutoff function-carrying hydraulic circuit for construction machines, adapted to improve the suspension capacity thereof by disengaging the cutoff function and increasing a maximum discharge pressure of the hydraulic circuit when the power and speed of a working unit are required at once in load suspending work, and stump digging work or boulder raising work.

2. Description of the Related Art

A hydraulic excavator of the related art is used to suspend a load in some cases by a boom extending operation. First related art hydraulic circuit for construction machines shown in FIG. 7 will now be described.

A discharge pipe line 1*a* of a variable displacement pump 1 is connected to a boom cylinder 3 via a direction change-over valve 2 for a boom, and a relief valve 4 for setting a maximum discharge pressure (set pressure P1) to the discharge pipe line 1*a* of the variable displacement pump 1. A discharge oil of a control pump 5 is set to a predetermined pressure by a fixed relief valve 6, and sent to a volume control unit 9 for the variable displacement pump 1 via a torque variable control valve 7 from a cutoff valve 8. The torque variable control valve 7 receives a discharge pressure P of the variable displacement pump 1, controls a discharge oil of the control pump 5, which has been set to a predetermined level, to such a control pressure that permits volume V (cc/rev) of the variable displacement pump 1 to set constant the torque K2 shown by P·V, and outputs the resultant control pressure. Namely, the control pressure becomes rectangularly hyperbolic as shown by the torque K2 in FIG. 8. The cutoff valve 8 receives a control pressure outputted from the torque variable control valve 7, and outputs when the discharge pressure P of the variable displacement pump 1 reaches a level in the vicinity of a set level P1 (i.e. Pa) of the relief valve 4 such a control pressure that makes the volume V of the variable displacement pump 1 decrease gradually and attain a minimum level V1 as shown by a curve C in FIG. 8. The volume control unit 9 comprises a volume control valve and a volume control cylinder (neither of which is shown) which are adapted to receive a control pressure outputted from the cutoff valve 8, and control the volume V of the variable displacement pump 1 as shown by K2 and C in FIG. 8.

The operation of the first related art hydraulic circuit will now be described with reference to FIGS. 7 and 8.

The volume V of the variable displacement pump 1 is controlled as shown by the torque curves K2 and C in FIG. 8, in accordance with the discharge pressure P of the variable displacement pump 1 which is determined depending upon a load pressure working on the boom cylinder 3. In FIG. 8, the volume V of the pump is taken in the direction of the lateral axis. When a discharge rate Q ($m^3$/min) of the pump is taken on the same axis, the torque curves shown by K2 and C turn into horsepower curves. Therefore, loss torque K1 (i.e. P1·V1) which the variable displacement pump 1 relieves at a point A at the cutoff time decreases as compared with that K2 (i.e. P1·V2) which the variable displacement pump 1 relieves at a point B at the cutoff operation stopping time. Consequently, the loss horsepower which the variable displacement pump 1 relieves at the point A decreases as compared with that which the variable displacement pump 1 relieves at the point B, so that the saving of energy is attained.

Second related techniques (disclosed, for example, in Japanese Patent Publication No. 72437/1994) shown in FIG. 9 will now be described. In the parentheses shown after the names of constituent elements of this related art hydraulic circuit, the names of corresponding constituent elements of the present invention will be inserted once each, and the descriptions will thereafter be given by referring to the name of constituent elements of the present invention with the constituent elements of this related art hydraulic circuit equivalent to those of the first related art hydraulic circuit designated by the same reference numerals to omit the descriptions thereof.

In a hydraulic circuit for a working unit of a hydraulic excavator, a return oil passage 10 passing through each direction change-over valve is connected to a tank 12 via a restriction 11. A discharge oil of a hydraulic pump (control pump) 5 the pressure in which is set at a predetermined level is sent to a pilot pressure receiving member 14*b* of a variable relief valve (relief valve) 14 via a solenoid valve 13, and further from one side of a shuttle valve 15 to a volume control unit 16 of a variable displacement hydraulic pump (variable displacement pump) 1. The other side of the shuttle valve 15 is connected to an upstream side of the restriction 11 provided in the return oil passage 10. The solenoid valve 13 is excited when a switch 19 provided on a free end of an operating lever 18 is pressed, and it is thereby shifted to a position b to cause the control pump 5 to be connected to the pilot pressure receiving member 14*b* and the first-mentioned side of the shuttle valve 15. When the hand pressing the switch 19 is removed therefrom, the solenoid valve is deexcited to be shifted to a position a, and connect the pilot pressure receiving member 14*b* and the first-mentioned side of the shuttle valve 15 to the tank 12. The relief valve 14 is set to a normal set level P1 when a pilot pressure is not supplied to the pilot pressure receiving member 14*b*, and shifted to a higher set level P2, which is higher than the normal set level P1, when a pilot pressure is supplied thereto.

The operation of the second related art hydraulic circuit will now be described. When regular excavation work is carried out by the hydraulic excavator, the switch 19 is not pressed, so that the solenoid valve 13 is deexcited, and takes the position a. Accordingly, the pilot pressure receiving member 14*b* and the first-mentioned side of the shuttle valve 15 are drained. Consequently, the relief valve 14 comes to have a normal set pressure P1, and a pressure oil in the portion of the return oil passage 10 which is on the upstream side of the restriction 11 works from the second-mentioned side of the shuttle valve 15 on the volume control unit 16. Owing to this operation, the variable displacement valve 1 is controlled so that, when none direction change-over valves, such as a direction change-over valve 2 for a boom is operated, a flow rate in the return oil passage 10 increases to cause the volume V of the variable displacement pump 1 to become minimal, and so that, when any one of the direction change-over valves, such as the direction change-over valve 2 for a boom is operated, a flow rate in the return oil passage 10 becomes zero to cause the volume V of the variable displacement pump 1 to become maximal.

In order to use the hydraulic excavator as a crane for load suspending work, the switch 19 of the operating lever 18 is pressed, so that the solenoid valve 13 is excited to take the position b. Accordingly, a pilot oil from the control pump 5 flows to the pilot pressure receiving member 14*b* to increase the oil pressure to a higher set level P2 as shown in FIG. 10, so that lifting power increases. Moreover, since a control pressure of the control pump 5 is applied from the first-mentioned side of the shuttle valve 15 to the volume control unit 16, the volume V of the variable displacement pump 1 is set to a lower level V3 as shown in FIG. 10.

However, these related techniques have the following problems.

(1) When load suspending work is carried out according to the first related techniques, the discharge pressure P of the pump increases, i.e., the load suspending work is necessarily carried out at a discharge pressure in the vicinity of a point A in FIG. 8. Consequently, the volume V of the pump decreases to cause a work speed to decrease, and an operation efficiency therefore also decreases. The discharge pressure P of the pump is set to P1 by the relief valve 4, and any higher suspending capability cannot be obtained. Therefore, the suspending capability becomes insufficient, and satisfactory load suspending work cannot be carried out.

(2) According to the second related techniques, when the switch 19 is pressed inadvertently or when a part of an operator touches the same while regular excavation work is carried out with a boom lowered, the pressure in the relief valve 14 increases up to the higher set level P2 against the operator's will to cause the excavation power to increase, and the volume of the variable displacement pump 1 decreases to a lower level V3 to prevent the obtainment of a sufficient working speed. Therefore, the operation efficiency of the operator decrease. Moreover, since hydraulic machines on the boom lowering side require pressure resistance in the same manner as those on the boom lifting side, so that the cost increases.

(3) When the direction change-over valve 2 for a boom is not operated for carrying out regular excavation work in the second related techniques, the volume V of the variable displacement pump 1 reaches a minimum level Vmin as shown in FIG. 10. When the direction change-over valve 2 for a boom is operated, the volume V of the variable displacement pump 1 reaches a maximum level Vmax. When the switch 19 is pressed during suspension work, not only the volume V of the variable displacement pump 1 changes from the minimum level Vmin or maximum level Vmax to a lower level V3 but also the pressure in the relief valve changes suddenly from the normal set level P1 to the higher set level P2. Since the volume V of the variable displacement pump 1 and the set pressure of the relief valve thus change suddenly, the degree of a shock given to each hydraulic machine and further to the construction machine as a whole increases to cause the durability of the equipment to lower.

SUMMARY OF THE INVENTION

The present invention has been developed with attention paid to these problems encountered in the above-described related techniques, and the objects thereof include providing a hydraulic circuit for construction machines which is capable of obtaining sufficient suspending power during load suspending work, and which attains an improved operation efficiency by minimizing a decrease in the speed of carrying out load suspending work.

To achieve the objects of the invention, the hydraulic circuit for construction machines according to a first invention is formed so that a variable displacement pump is connected to actuators for driving working units corresponding thereto respectively via a plurality of direction change-over valves, a relief valve for setting a maximum discharge pressure being connected to a discharge pipe line of the variable displacement pump, the cutoff of the volume of the variable displacement pump being controlled via a cutoff valve adapted to reduce a discharge rate of the variable displacement pump gradually and have the same rate reach a minimum level when a discharge pressure of the variable displacement pump becomes close to a set pressure of the relief valve, the hydraulic circuit including a suspension mode switch for setting a working mode to a suspension mode, a lift detecting sensor for detecting a predetermined actuator operated to a load lifting side, a relief valve control unit capable of freely setting an object pressure of the relief valve to a normal set level and a high set level higher than the normal set level, a cutoff valve control unit capable of freely switching the cutoff valve to a cutoff operation executing mode and a cutoff operation disengaging mode, and a controller adapted to increase a set pressure of the relief valve by outputting an instruction to the relief valve control unit when the controller receives a suspension mode signal and a lift detected signal from the suspension mode switch and lift detecting sensor respectively, and disengage the cutoff function of the cutoff valve by outputting an instruction to the cutoff valve control unit.

According to the first invention, when the controller receives a lift detected signal and a suspension mode signal from the lift detecting sensor and suspension mode switch respectively, it outputs an instruction to the relief valve control unit and increases a set pressure of the relief valve; and outputs an instruction to the cutoff valve control means and disengage the cutoff function of the cutoff valve. Therefore, the suspending capability increases by a level corresponding to the increased portion of the set pressure of the relief valve, and the cutoff function is disengaged to cause a working speed to increase correspondingly to the increased portion of the volume of the variable displacement pump. Moreover, when a single lifting operation (for example, the lifting of a boom of a hydraulic excavator) of a predetermined actuator is carried out, the pressure is increased automatically, and the cutoff function is disengaged. Therefore, it is not necessary that the operator presses the switch every time the suspending capability increases. This enables the operation efficiency and controllability of an operation which requires the power and speed of a working unit at once, such as load suspending work, stump digging work and boulder raising work to be improved.

The hydraulic circuit for construction machines according to a second invention is characterized in that it is provided with an other-operation sensor adapted to detect an operation of other actuator which is other than the predetermined actuator in the first invention, wherein, when the controller receives a detected signal from the other-operation sensor, it outputs an instruction to the relief valve control unit and returns the increased high set pressure of the relief valve to a normal set level; and outputs an instruction to the cutoff valve control unit and restores the cutoff function of the cutoff valve.

According to the second invention, when the controller receives an operating signal from the other-operation sensor for some other actuator which is other than the predetermined actuator, it outputs an instruction to the relief valve control unit and returns the increased set pressure of the relief valve to an original normal set level; and outputs an instruction to the cutoff valve control unit and restores the cutoff function of the cutoff valve. Accordingly, during a complex operation of a construction machine, such as a regular excavation operation, the pressure of the relief valve has a normal set pressure, and a pressure higher than a required level is not applied to other actuators. Therefore, inconveniences, such as the leakage of oil is prevented, and the durability of the machine is improved. When the cutoff function is restored, so that a discharge oil of the variable displacement pump is relieved, the volume of the pump decreases to cause the driving horsepower to lower. Consequently, the saving of energy, such as the reduction of fuel consumption of the engine is effected.

The hydraulic circuit for construction machines according a third invention is characterized in that it is formed in the same manner as either the first invention or the second invention with a first buffer unit for reducing a variation rate with respect to time of a set pressure of the relief valve, and a second buffer unit for reducing a variation rate with respect to time of a control pressure for switching a cutoff function executing mode of the cutoff valve and a cutoff function disengaging mode thereof from one to the other provided.

According to the third invention, a variation rate at which the set pressure of the relief valve is shifted to a normal set level or an increased high set level is reduced by the first buffer unit with a variation rate with respect to time of a control pressure for switching a cut off function executing mode and a cutoff function disengaging mode from one to the other reduced by the second buffer unit. Therefore, a shock given to the hydraulic circuit at the pressure changing time decreases, and this causes a shock given to each hydraulic machine and further to the construction machine as a whole to be lessened, so that the durability of the equipment is improved.

DESCRIPTION OF THE PREFERRED EMBODIMENTS

Figure 1:
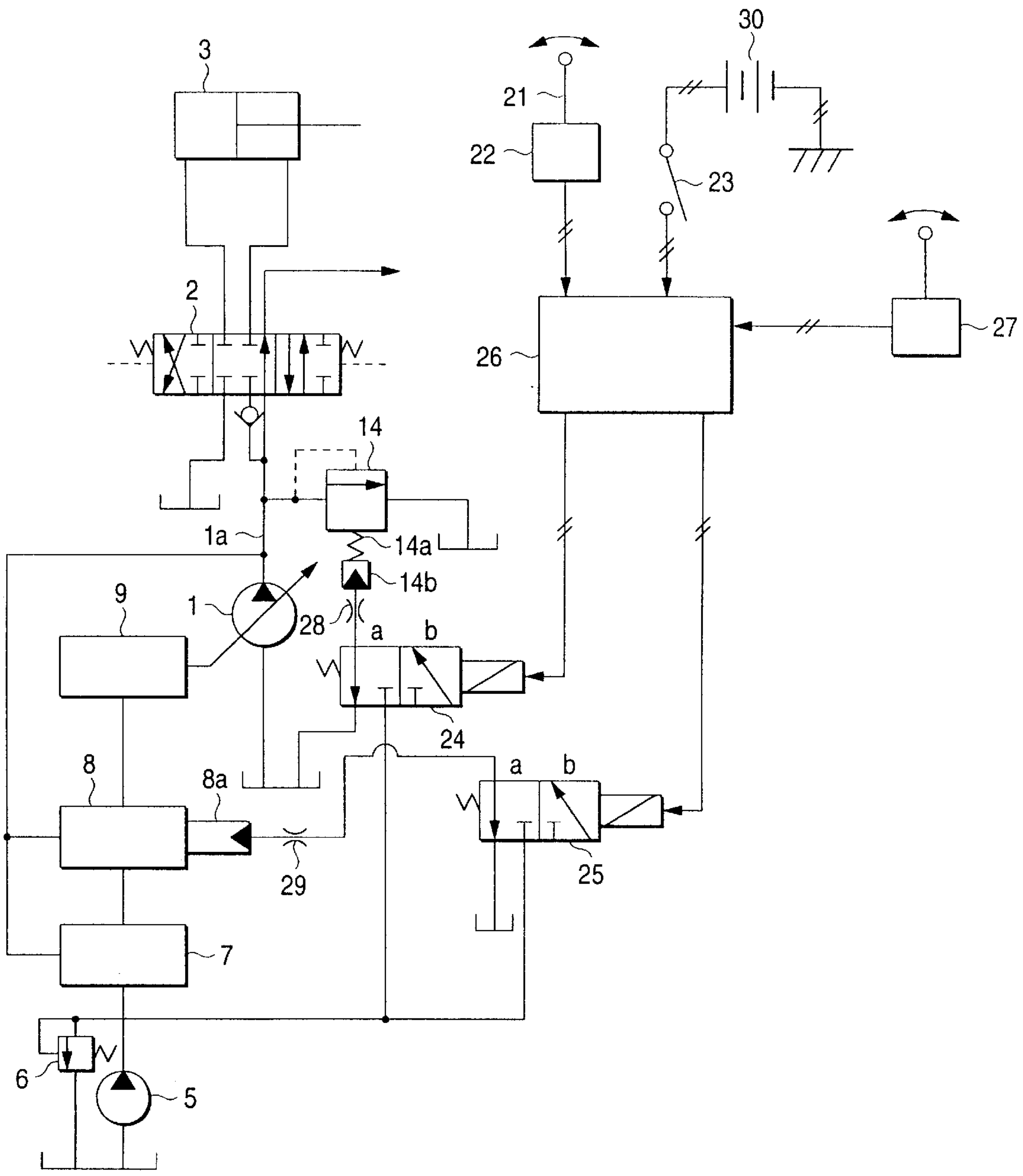
FIG. 1 is a diagram of a hydraulic circuit of a first mode of embodiment of the present invention.

The modes of embodiment of the present invention will now be described with reference to FIGS. 1 to 5. The constituent elements equivalent to those of the related art example of FIGS. 7 to 10 will be designated by the same reference numerals to omit the descriptions thereof.

First, the construction of a first mode of embodiment will be described with reference to FIGS. 1 and 2.

A relief valve 14 capable of setting a maximum discharge pressure in a plurality of stages is connected to a discharge line 1*a* of the variable displacement pump 1. This relief valve 14 has a pilot pressure receiving member 14*b* adapted to increase a set load of a pressure setting spring 14*a*. A lift detecting sensor 22 for detecting a boom cylinder 3 (example of a predetermined actuator) moved to a lifting side, by detecting a lifting operation of a boom operating lever 21, an other-operation sensor 27 for detecting a bucket operating cylinder (example of other actuator) moved, by detecting an operation of a bucket operating lever, and a suspension mode switch 23 for setting an operation mode to a suspension mode are provided. The controller 26 receives a lift detected signal from the lift detecting sensor 22 and a suspension mode signal from the suspension mode switch 23, and excites a first electromagnetic change-over valve 24 (example of a relief valve control unit) and a second electromagnetic change-over valve 25 (example of a cutoff valve control unit) when the controller receives a detected signal from the other-operation sensor 27.

The first electromagnetic change-over valve 24 is shifted to a position a in which the pilot pressure receiving member 14*b* of the relief valve 14 is connected to a tank 12 when this valve is deexcited, and to a position b in which the pilot pressure receiving member 14*b* is connected to a control pump 5 (control pressure source) when the same valve is excited. The second electromagnetic change-over valve 25 is shifted to a position a in which the pilot pressure receiving member 8*a* of a cutoff valve 8 is connected to the tank 12 when this valve is deexcited, and to a position b in which the pilot pressure receiving member 8*a* to the control pump 5 when the same valve is excited. When the controller 26 receives a detected signal indicating that the bucket cylinder has been operated from the other-operation sensor 27 during the reception of a detected signal and a suspension mode signal from the lift detecting sensor 22 and suspension mode switch 23 respectively, it deexcites the first and second electromagnetic change-over valves 24, 25, and, when the detected signal indicating that the bucket cylinder has been operated is cut off, it excites the first and second electromagnetic change-over valves 24, 25 again. A pipe line connecting the pilot pressure receiving member 14*b* and first electromagnetic change-over valve 24 together is provided with a first restriction 28 (example of a first buffer unit), and a pipe line connecting the pilot pressure receiving member 8*a* and second electromagnetic change-over valve 25 together a second restriction 29 (example of a second buffer unit). A reference numeral 30 denotes a control power source.

The construction of the cutoff valve shown in FIGS. 2 and 3 will be described.

The cutoff valve 8 has a function of receiving an output pressure Pt from a torque variable valve 7 and controlling the same to a level of an output pressure Pc from the cutoff valve 8, and outputting the resultant pressure to a volume control unit 9 for the variable displacement pump 1.

A spool member 8*s* is inserted slidably in a spool hole 41 formed in a cutoff valve body (hatched) of a spool 8. A first piston hole 42 communicating with the spool hole 41 is formed on the outer side of one end of the spool hole 41, and a second piston hole 44 on the outer side of the first piston hole. A first pressure chamber 43 to which a discharge pressure P of the variable displacement pump 1 shown in FIG. 1 is applied is formed between the first and second piston holes 42, 44, and a second pressure chamber 45 to which the output pressure Pc from the cutoff valve 8 is applied on the outer side of the second piston hole 44. A first piston 8*b* one end of which contacts one end of the spool member 8*s* is inserted slidably in the first piston hole 42, and a second piston 8*c* one end of which contacts the other end of the first piston 8*b* in the second piston hole 44.

A spring chamber 46 communicating with the spool hole 41 is formed on the outer side of the other end of the spool hole 41, and a pilot pressure receiving member 8*a* on the outer side of the spring chamber via a third piston hole 47. The spring chamber 46 is provided therein with a spring 8*d* one end of which contacts the other end of the spool member 8*s*, and a spring seat 8*g* which the other end of the spring 8*d* contacts, and the spring seat 8*g* normally contacts an end surface 48 on the second-mentioned end side of the spring chamber 46 owing to a resilient force of the spring 8*d*. A third piston 8*h* is inserted slidably in the third spring hole 47, and one end of the third spring 8*h* contacts the spring seat 8*g*. The pilot pressure receiving member 8*a* receives a discharge oil supplied from the control pump 5 shown in FIG. 1, via the second electromagnetic change-over valve 25, and a pilot pressure of the pilot pressure receiving member 8*a* is exerted on the other end of the third piston 8*h*.

Figure 2:
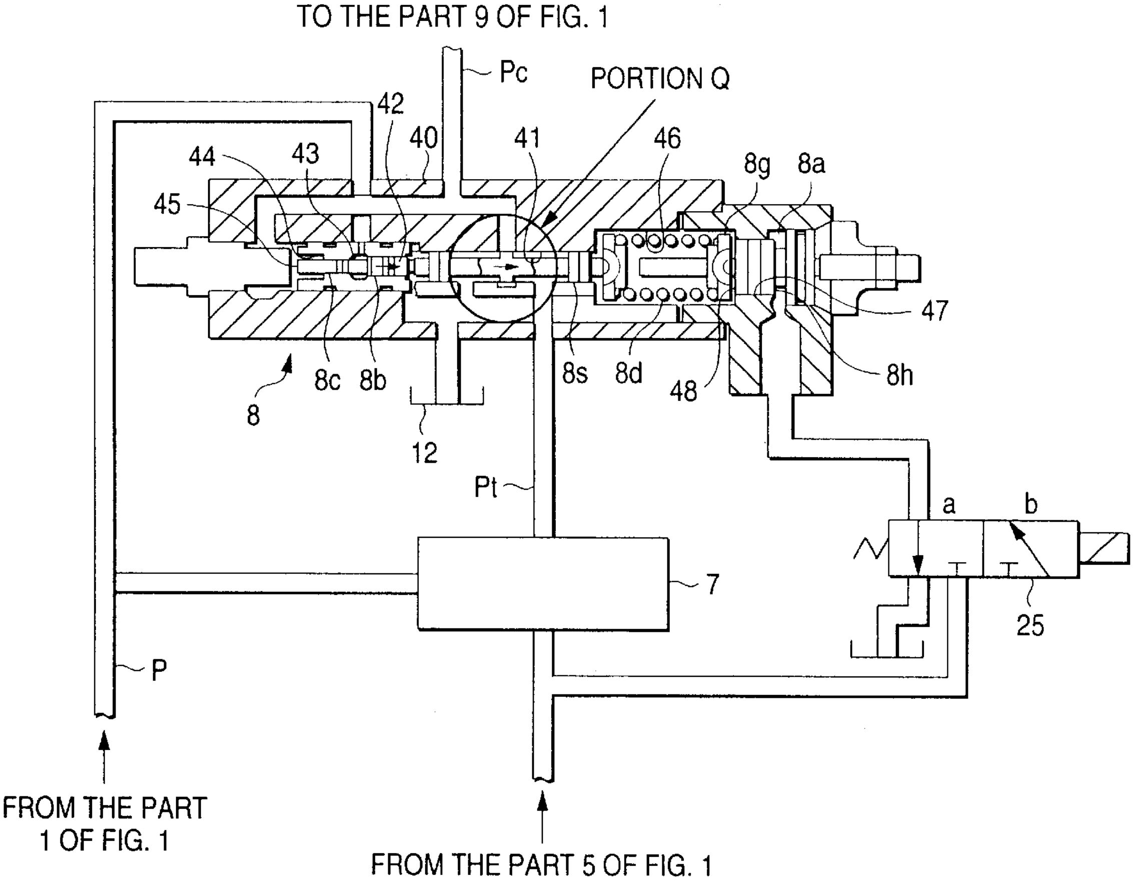
FIG. 2 is a detail drawing of a cutoff valve shown in FIG. 1.
Figure 3:
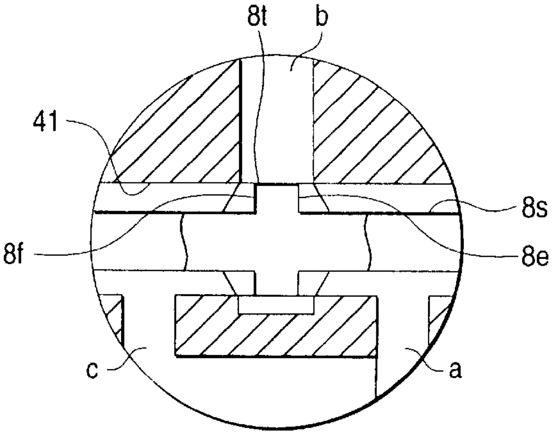
FIG. 3 is a detail drawing of a Q portion of what is shown in FIG. 2.

FIG. 3 shows the details of a Q portion of FIG. 2. As shown in FIG. 3, the spool 8*s* is provided with a restriction member 8*t*, and one portion of the restriction member 8*t* and spool hole 41 form a first restriction portion 8*e* interposed between an output oil chamber b of the cutoff valve 8 and an input oil chamber a communicating with the torque variable control valve 7, the other portion of the restriction member 8*t* and spool hole 41 forming a second restriction portion 8*f* interposed between the output oil chamber b of the cutoff valve 8 and a drain chamber c communicating with the tank 12.

The operation of the cutoff valve will now be described with reference to FIG. 4 as well as FIGS. 2 and 3.

Figure 4:
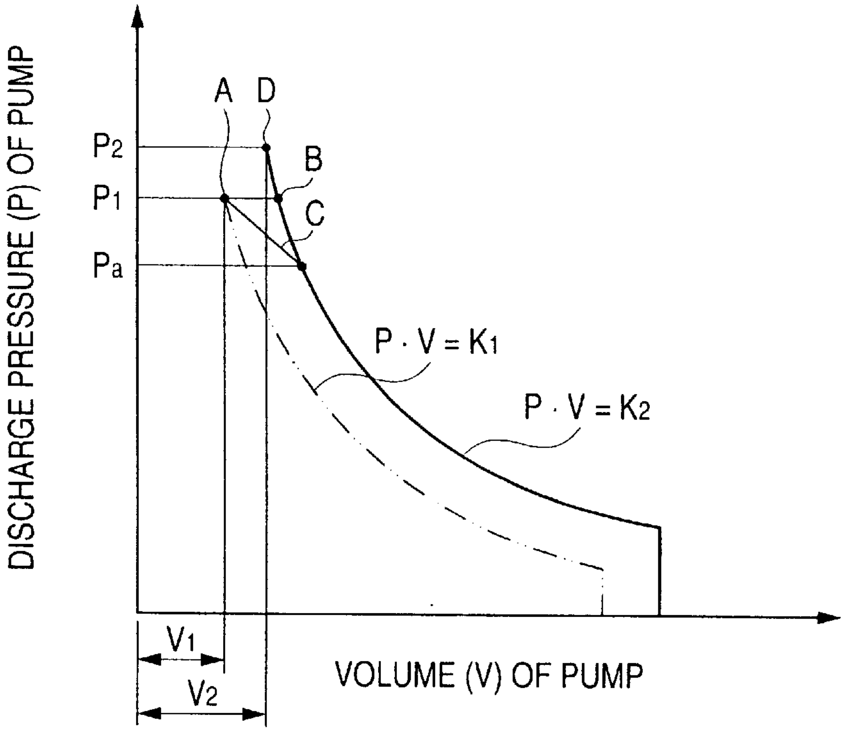
FIG. 4 is a curve showing the relation between a discharge pressure and volume of a pump in the hydraulic circuit shown in FIG. 1.

When a load increases to cause a discharge pressure P of the variable displacement pump 1 to reach a predetermined level Pa (set by the spring 8*d*) close to a normal set level P1 of the relief valve 14 shown in FIG. 4, while the second electromagnetic change-over valve 25 is deexcited with a control pressure of the control pump 5 not working on the pilot pressure receiving member 8*a*, the sum of the force of the first and second pistons 8*b*, 8*c* which work on the first-mentioned end of the spool 8*s* overcomes the resilient force of the spring 8*d*, and the spool 8*s* begins to move in the direction of an arrow in FIG. 2. Accordingly, an opening of the first restriction portion contracts, and that of the second restriction portion 8*f* expands, so that an output pressure Pc of the cutoff valve 8 in the output oil chamber b gradually decreases. The volume control unit 9 constitutes a positive control mechanism which reduces the volume V of the pump when a control pressure decreases, and increases the volume V thereof when the control pressure increases. Therefore, the volume control unit 9 performs a cutoff function of gradually reducing the volume of the pump to a minimum level V1 in accordance with a gradual decrease in the output pressure Pc of the cutoff valve 8, and thereby reducing a relief loss.

When a control pressure of the control pump 5 is applied to the pilot pressure receiving member 8*a* by exciting the second electromagnetic change-over valve 25 and thereby shifting the same to the position b, a set force of the spring 8*d* increases via the third spring 8*h*, so that the spool 8*s* is pressed in the direction opposite to the direction of an arrow in FIG. 2. Consequently, the opening of the first restriction portion 8*e* expands with that of the second restriction portion 8*f* contracting, so that the output pressure Pc of the cutoff valve 8 in the output oil chamber b increases to a maximum level to disengage the cutoff function.

TABLE 1

| Suspension mode switch | Boom lever | Bucket lever | First and second electro-magnetic change-over valves | Set pressure of relief valve | Cutoff function |
|---|---|---|---|---|---|
| OFF | Not related to operation of lever | | Deexcited | P1 ($kg/cm^2$) | Engaged |
| ON | Lifting operation | Operated Neutral | Excited | P2 ($kg/cm^2$) | Disengaged |

The operation of this mode of embodiment will be described with reference to Table 1.

(1) When the suspension mode switch 23 is turned off in order to carry out a regular excavation operation without carrying out suspension work, the controller 26 does not receive a suspension mode signal from the suspension mode switch 23, so that the first and second electromagnetic change-over valves 24, 25 are deexcited irrespective of the operation of the boom operating lever 21 and those of other actuators, such as the bucket operating lever. Accordingly, the pilot pressure receiving member 14*b* of the relief valve 14 is connected to the tank 12 via the position a of the first electromagnetic change-over valve 24, so that the set pressure of the relief valve 14 remains to be at a normal set level P1. Consequently, a pressure of a level higher than a necessary level is not applied to other actuators, and this prevents the occurrence of inconveniences, such as the leakage of oil, and serves to improve the durability of the equipment. Since the pilot pressure receiving member 8*a* of the cutoff valve 8 is connected to the tank 12 via the position a of the second electromagnetic change-over valve 25, the cutoff function of the cutoff valve 8 is performed. As a result, when the discharge oil of the variable displacement pump 1 is relieved, the volume V of the pump decreases in the same manner as in the related techniques shown in FIGS. 7 and 8, so that the saving of the energy for generating a driving force for the variable displacement pump 1 is effected.

(2) When the suspension mode switch 23 is turned on with the boom operating lever 21 lifted in order to carry out a suspension operation, the controller 26 receives a lifting operation detected signal from the lift detecting sensor 22 and a suspension mode signal from the suspension mode switch 23, and, when other actuators, such as the bucket operating lever is neutral, the controller excites the first and second electromagnetic change-over valves 24, 25. Since the pilot pressure receiving member 14*b* of the relief valve 14 is connected to the control pump 5 via the position b of the first electromagnetic change-over valve 24, the normal set pressure of the relief valve 14 increases from P1 to a high set level P2 (P1⊂P2). Since the pilot pressure receiving member 8*a* of the cutoff valve 8 is connected to the control pump 5 via the position b of the second electromagnetic change-over valve 25, the cutoff function of the cutoff valve 8 is disengaged.

Therefore, a suspending capability increases as shown in FIG. 4, by a level corresponding to an increased portion (P2-P1) of the set pressure of the relief valve 14, and a working speed increases by a level corresponding to an increased portion (V2-V1), which is ascribed to the disengagement of the cutoff function, of the volume V of the variable displacement pump 1, whereby the efficiency of a load suspension operation is improved.

When the controller 26 receives a detected signal indicating that an operation of the bucket cylinder has been detected from the other-operation sensor 27 during the reception of a lift detected signal and a suspension mode signal from the lift detecting sensor 22 and suspension mode switch 23 respectively, it deexcites the first and second electromagnetic change-over valves 24, 25. Therefore, the operation carried out in this case is identical with that carried out by turning off the suspension mode switch 23 in the case (1) above. When a detected signal of an operation of the bucket cylinder is turned off, the first and second electromagnetic change-over valves 24, 25 are excited again automatically. Accordingly, the suspension capability increases by a level corresponding to an increased portion of the set pressure of the relief valve 14, and the cutoff function is disengaged to cause a working speed to increase by a level correspondingly to an increased portion of the volume V of the variable displacement pump 1, so that the operation efficiency is improved.

Since the changing of the set pressure of the relief valve 14 and the changing of the engaging and disengaging of the cutoff function are thus done automatically, the operation controllability and operation efficiency of the operator are improved.

Figure 5:
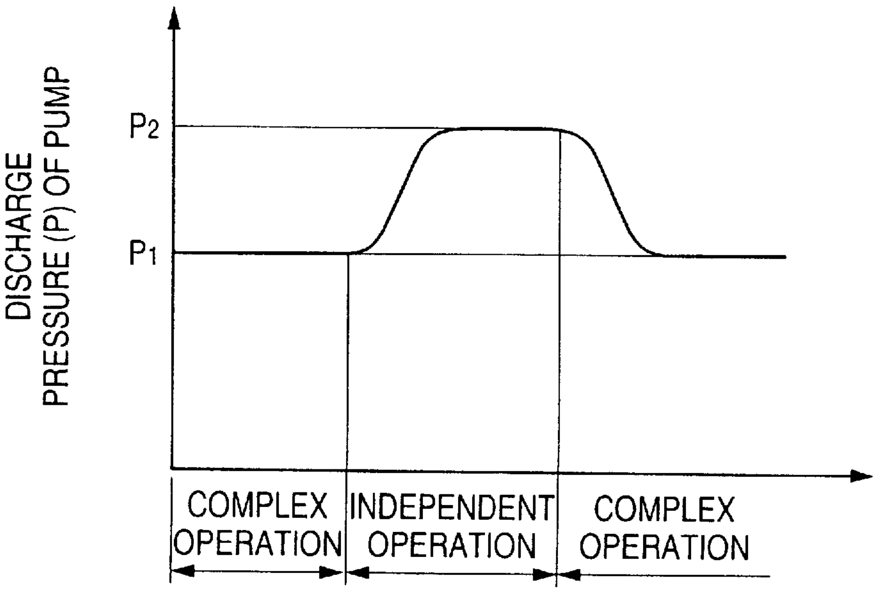
FIG. 5 is a diagram showing variation of a hydraulic pressure at the time of switching a normal set pressure and an increased high set pressure from one to the other.

The variation rates at which the pressure of the relief valve 14 is shifted to the normal set level P1 and increased high level P2 as shown in FIG. 5 are reduced by the first restriction 28. Similarly, the variation rates of the pressure on the pilot pressure receiving member 8*a* at the time of shifting the mode of operation of the cutoff valve 8 to a cutoff function engaging mode and a cutoff function disengaging mode are reduced by the second restriction 29, so that the variation of the discharge volume V of the variable displacement pump 1 is lessened. Consequently, a shock given to the hydraulic circuit, and further to the construction machine as a whole is lessened, so that the durability of the construction machine is improved.

Although this mode of embodiment is provided with the first and second restrictions 28, 29, the invention is not limited to the embodiment. A signal outputted from the controller 26 to the first and second electromagnetic change-over valves 24, 25 may be varied smoothly.

The relief valve 14 is adapted to be switched in two stages but the relief valve switching system is not limited to the two-stage switching system. Adapting the relief valve to be switched in not smaller than three stages by the operator can also be done easily.

Figure 6:
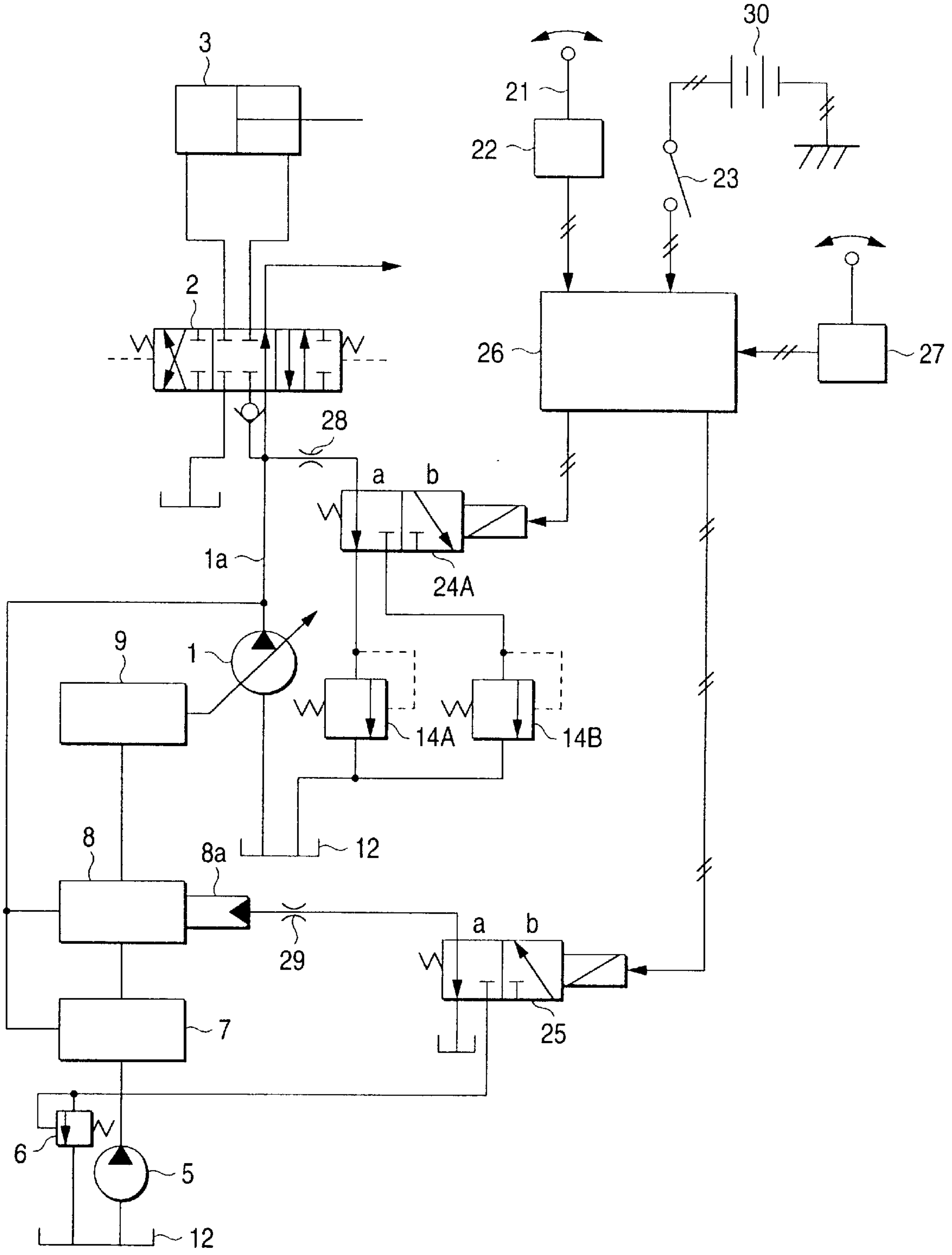
FIG. 6 is a diagram of a hydraulic circuit of a second mode of embodiment of the present invention.
Figure 7:
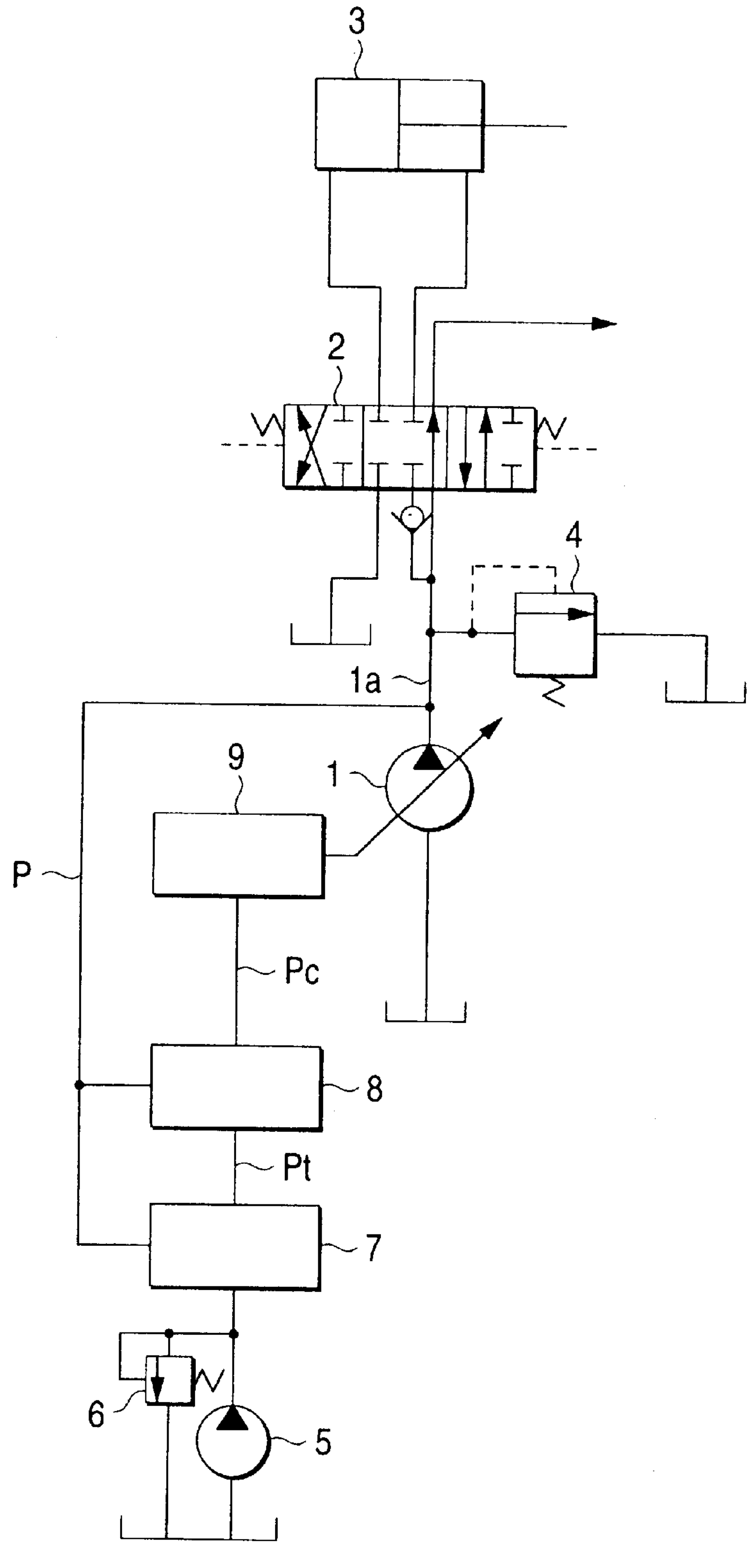
FIG. 7 shows a diagram of a first related art hydraulic circuit.
Figure 8:
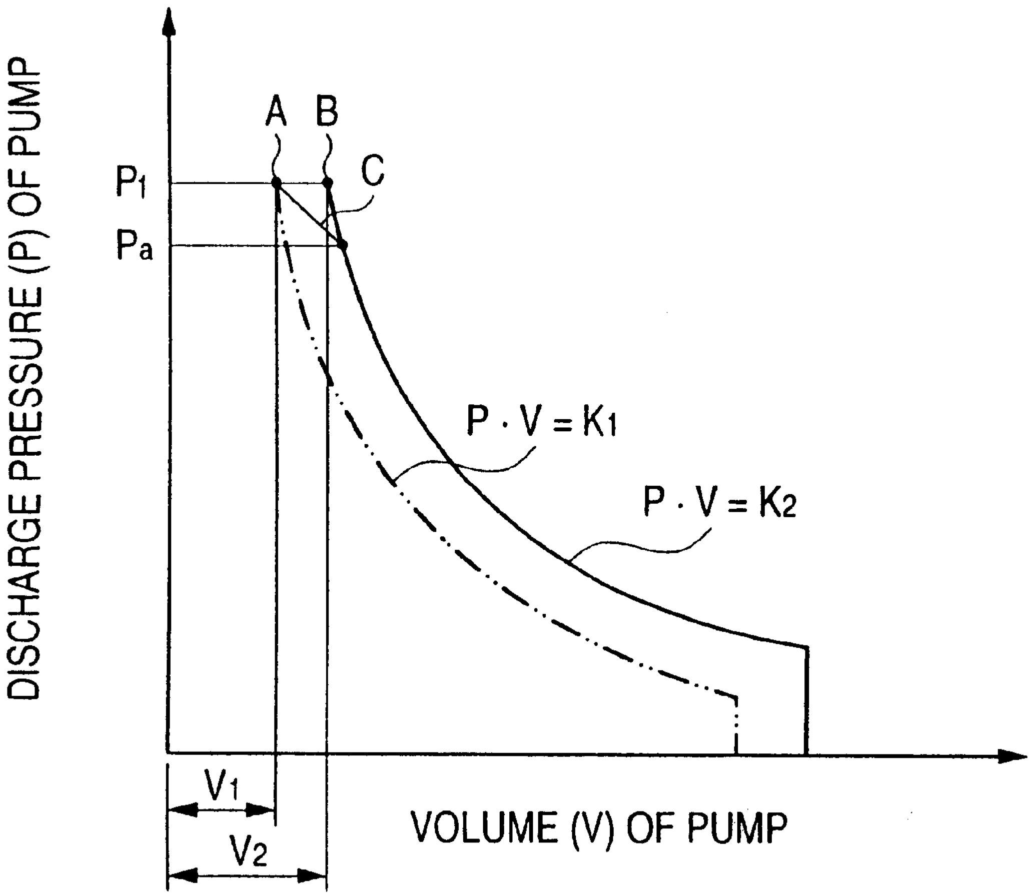
FIG. 8 is a curve showing the relation between a discharge pressure and volume of a pump in the hydraulic circuit shown in FIG. 7.
Figure 9:
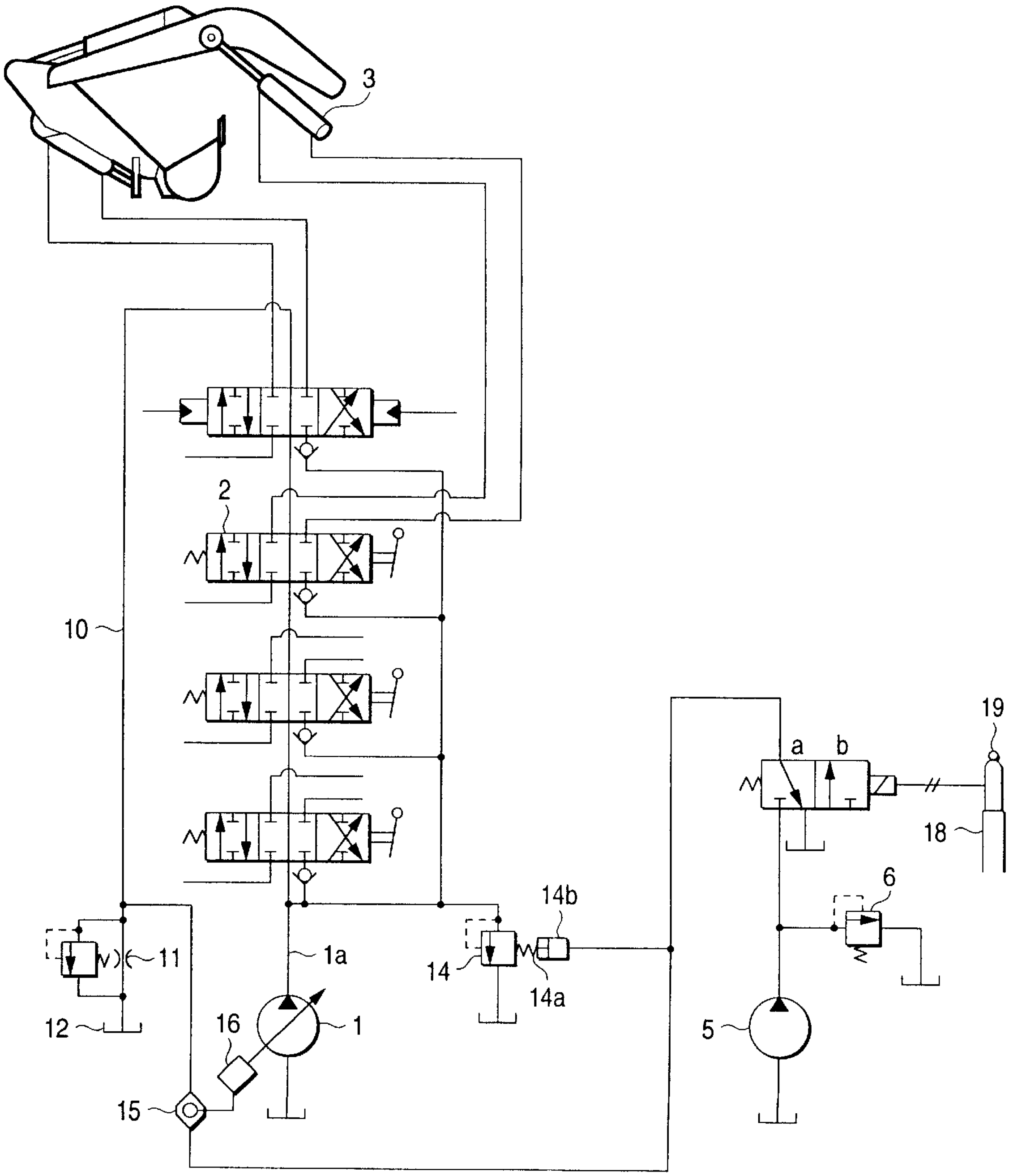
FIG. 9 is a diagram of a second related art hydraulic circuit.
Figure 10:
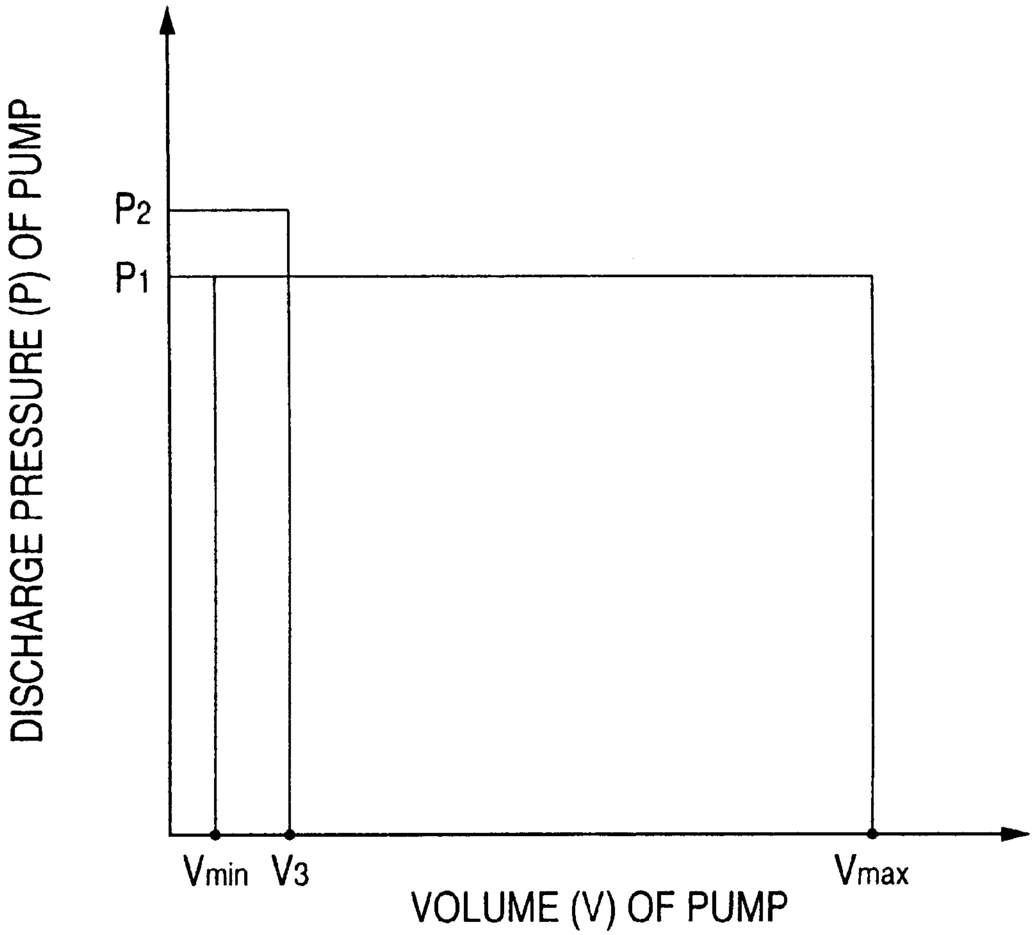
FIG. 10 is a curve showing the relation between a discharge pressure and volume of a pump in the hydraulic circuit shown in FIG. 9.

The construction of a second mode of embodiment will now be described with reference to FIG. 6.

In the first mode of embodiment, a part to which the pilot pressure receiving member 14*b* of the relief valve 14 is connected is shifted from the control pump 5 to the tank 12, and vice versa by the first electromagnetic change-over valve 24, whereby the setting of a maximum discharge pressure of the discharge pipe line 1*a* is changed. In the second mode of embodiment, two relief valves of different set pressures, i.e. a normal set pressure relief valve 14A and a high set pressure relief valve 14B are connected to a discharge pipe line 1*a* of a variable displacement pump 1 via a first electromagnetic change-over valve 24A. Since the construction of the remaining portion of this mode of embodiment is identical with that of the corresponding portion of the first mode of embodiment, the descriptions thereof will be omitted.

The operation and effects of the second mode of embodiment will be described.

When the first electromagnetic change-over valve 24A is deexcited, it is shifted to a position a, so that the discharge pipe line 1*a* is connected to the normal set pressure relief valve 14A, and, when the first electromagnetic change-over valve 24A is excited, it is shifted to a position b, so that the discharge pipe line 1*a* is connected to the high set pressure relief valve 14B with a maximum discharge pressure of the discharge pipe line 1*a* increasing, in the same manner as in the first mode of embodiment shown in FIG. 1. Since the operation and effect of the remaining portion of this mode of embodiment are identical with those of the corresponding portion of the first mode of embodiment, the descriptions thereof will be omitted.

As described above, when a working machine other than the boom is operated in a suspension mode even during a boom lifting operation, a maximum discharge pressure of a circuit of the working machine is set to a normal set level, and a cutoff operation is controlled at a pressure close to a relief set pressure. This enables the energy for driving the variable displacement pump 1 to be saved, and the pressure in the circuit for a working machine other than a boom to be reduced.

When an operation of a working machine other than a boom is stopped in the above-mentioned suspension mode in which a boom lifting operation and an operation of the working machine other than the boom are carried out simultaneously, i.e., when an operation of the construction machine is shifted to an independent boom lifting operation, the maximum discharge pressure of the circuit of the working machine is set to a high set level, and the cutoff control function is disengaged (stopped). Consequently, the following remarkable effects are obtained.

(1) The working capability is improved owing to an increase in the boom suspending capability and working speed.

(2) The efficiency of an independent boom lifting operation is improved.

(3) The capability of controlling an operation by an operator is improved owing to the automatic change-over devices.

In the above-described modes of embodiment, the lift detecting sensor 22 detects the lifting of a boom operating lever but the present invention is not limited to this operation. The detection operation may also be carried out on the basis of a pilot pressure at the boom lifting side for a case where a pilot type direction change-over valve 2 for a boom is used. The same applies to the other-operation sensor 27.

The suspension mode switch may be provided on either the boom operating lever 21 or a console panel on a driver's seat.

What is claimed is:

1. A hydraulic circuit for construction machines, formed so that a variable displacement pump is connected to actuators for driving working units corresponding thereto respectively via a plurality of direction change-over valves, a relief valve for setting a maximum discharge pressure being connected to a discharge pipe line of the variable displacement pump, the cutoff of the volume of the variable displacement pump being controlled via a cutoff valve adapted to reduce a discharge rate of the variable displacement pump gradually and have the same rate reach a minimum level when a discharge pressure of the variable displacement pump becomes close to a set pressure of the relief valve, the hydraulic circuit comprising:

a suspension mode switch for setting a working mode to a suspension mode, a lift detecting sensor for detecting a predetermined actuator which has been operated to a load lifting side, a relief valve control unit capable of freely setting an object pressure of the relief valve to a normal set level and a high set level higher than the normal set level, a cutoff valve control unit capable of freely switching the cutoff valve to a cutoff operation executing mode and a cutoff operation disengaging mode, and a controller adapted to increase a set pressure of the relief valve by outputting an instruction to the relief valve control unit when the controller receives a suspension mode signal and a lift detected signal from the suspension mode switch and lift detecting sensor respectively, and disengage the cutoff function of the cutoff valve by outputting an instruction to the cutoff valve control unit.

2. A hydraulic circuit for construction machines according to claim 1, wherein the hydraulic circuit is provided with an other-operation sensor adapted to detect an operation of some other actuator which is other than the predetermined actuator, in which, when the controller receives a detected signal from the other-operation sensor, the controller outputs an instruction to the relief valve control unit and returns the increased high set pressure of the relief valve to a normal set level; and outputs an instruction to the cutoff valve control unit and restores the cutoff function of the cutoff valve.

3. A hydraulic circuit for construction machines according to claim 1, wherein:

the hydraulic circuit is provided with a first buffer unit for reducing a variation rate with respect to the time of a set pressure of the relief valve, and a second buffer unit for reducing a variation rate with respect to the time of a control pressure for switching a cutoff function executing mode of the cutoff valve and a cutoff function disengaging mode thereof from one to the other.

4. A hydraulic circuit for construction machines according to claim 2, wherein:

the hydraulic circuit is provided with a first buffer unit for reducing a variation rate with respect to the time of a set pressure of the relief valve, and a second buffer unit for reducing a variation rate with respect to the time of a control pressure for switching a cutoff function executing mode of the cutoff valve, and a cutoff function disengaging mode thereof from one to the other.

* * * * *